United States Patent [19]

Teppo

[11] Patent Number: 4,931,231

[45] Date of Patent: Jun. 5, 1990

[54] METHOD FOR MANUFACTURING DISCRETE PELLETS OF ASPHALTIC MATERIAL

[75] Inventor: Maynard Teppo, Belle Fourche, S. Dak.

[73] Assignee: American Colloid Company, Arlington Heights, Ill.

[21] Appl. No.: 725,927

[22] Filed: Apr. 22, 1985

[51] Int. Cl.$^5$ .............................................. B29B 9/10
[52] U.S. Cl. ...................................... 264/13; 264/37; 425/6
[58] Field of Search ..................... 264/5, 6, 13, 14, 37; 425/6

[56] References Cited

U.S. PATENT DOCUMENTS

| | | | |
|---|---|---|---|
| 1,951,790 | 3/1934 | Curran | 425/6 |
| 3,345,235 | 10/1967 | Miller | 264/14 |
| 3,437,488 | 4/1969 | Humphreys | 264/13 |
| 4,149,837 | 4/1979 | Baker et al. | 264/14 |
| 4,213,924 | 7/1980 | Shirley | 264/14 |
| 4,389,356 | 6/1983 | Higgins | 264/9 |

FOREIGN PATENT DOCUMENTS

| | | | |
|---|---|---|---|
| 677726 | 1/1964 | Canada | 264/14 |
| 57-131302 | 8/1982 | Japan | 425/6 |

*Primary Examiner*—Jan H. Silbaugh
*Assistant Examiner*—Mary Lynn Fertig
*Attorney, Agent, or Firm*—Marshall, O'Toole, Gerstein, Murray & Bicknell

[57] ABSTRACT

A method and apparatus for manufacturing discrete solid particles of hydrocarbonaceous material, such as asphaltenes, in relatively dustless form includes heating the hydrocarbonaceous material, solid at standard conditions of temperature and pressure, to maintain the hydrocarbonaceous material in liquid form, and flowing the liquid hydrocarbonaceous material by gravity as an elongated annular stream into a reservoir of cooling liquid, such as cooling water, to solidify and shatter the annular stream into discrete solid particles in relatively dustless form. The apparatus includes a hopper for collecting a mass of heated liquid hydrocarbonaceous material; a heating source for heating the hydrocarbonaceous material to maintain it in liquid form; and flow channels operatively connected to the hopper at an upper level of the liquid hydrocarbonaceous material for flowing the liquid hydrocarbonaceous material in an elongated annular stream through the flow channel and into the reservoir of cooling water. Discrete solid particles are collected from the cooling water and conveyed to a drying and cooling zone and can be packaged in discrete particles of relatively uniform size in dustless form for transporting for reliquification and use on site in any industry where hydrocarbonaceous heavy materials, such as asphalt, are used.

30 Claims, 2 Drawing Sheets

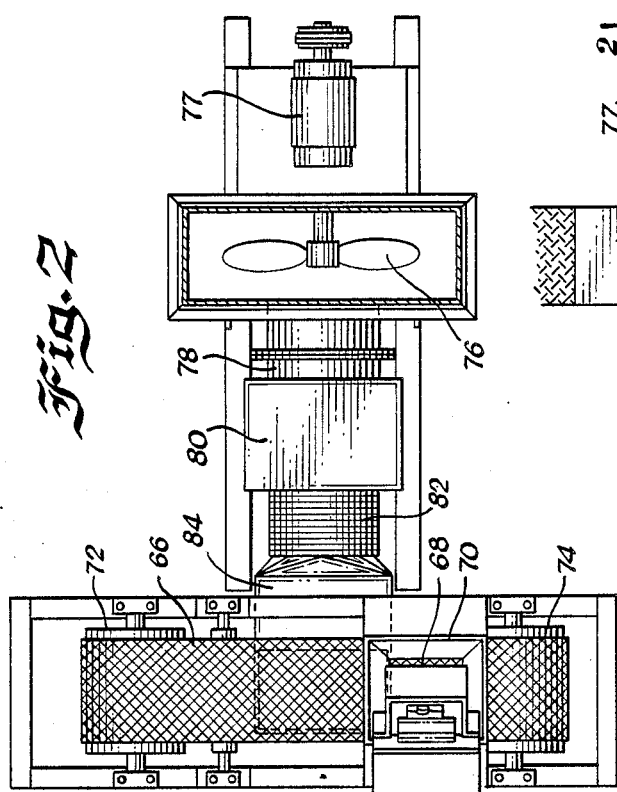
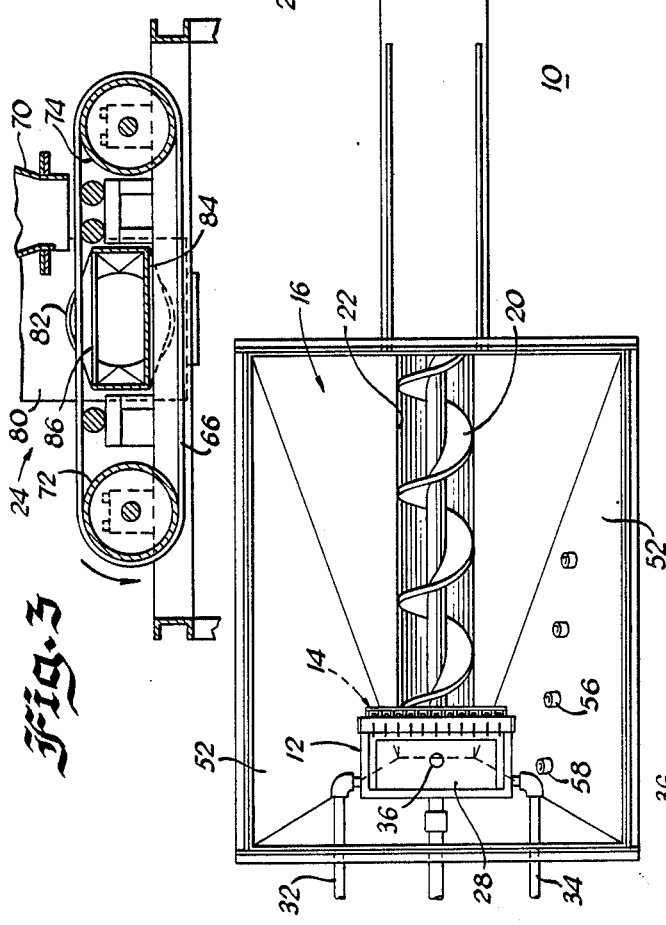
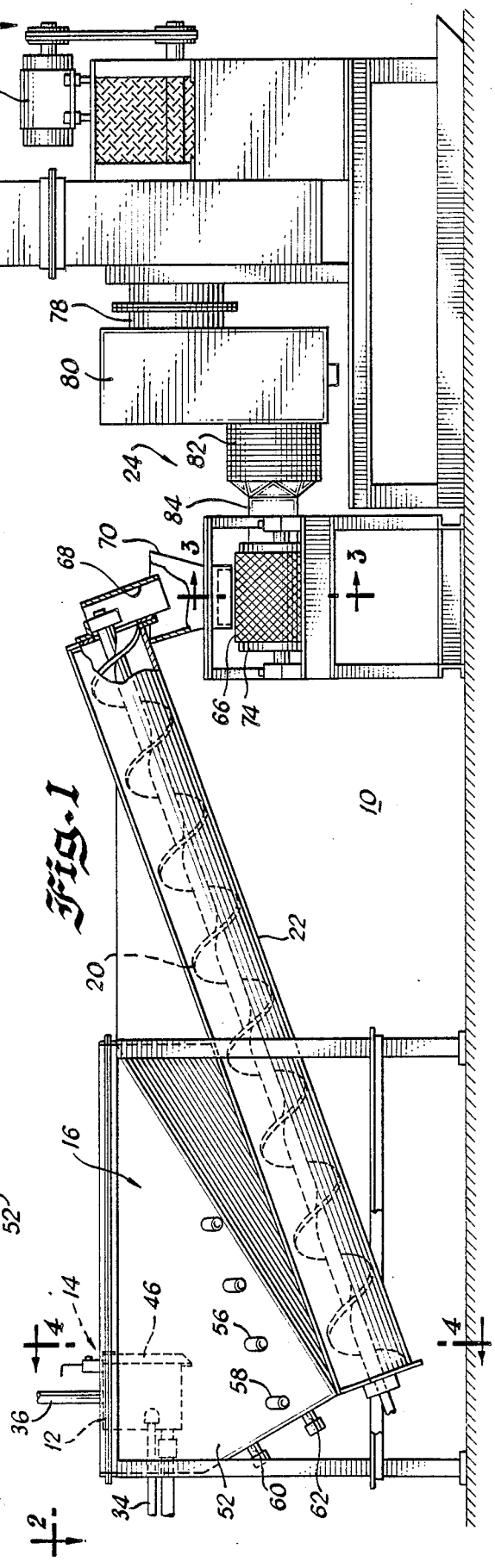

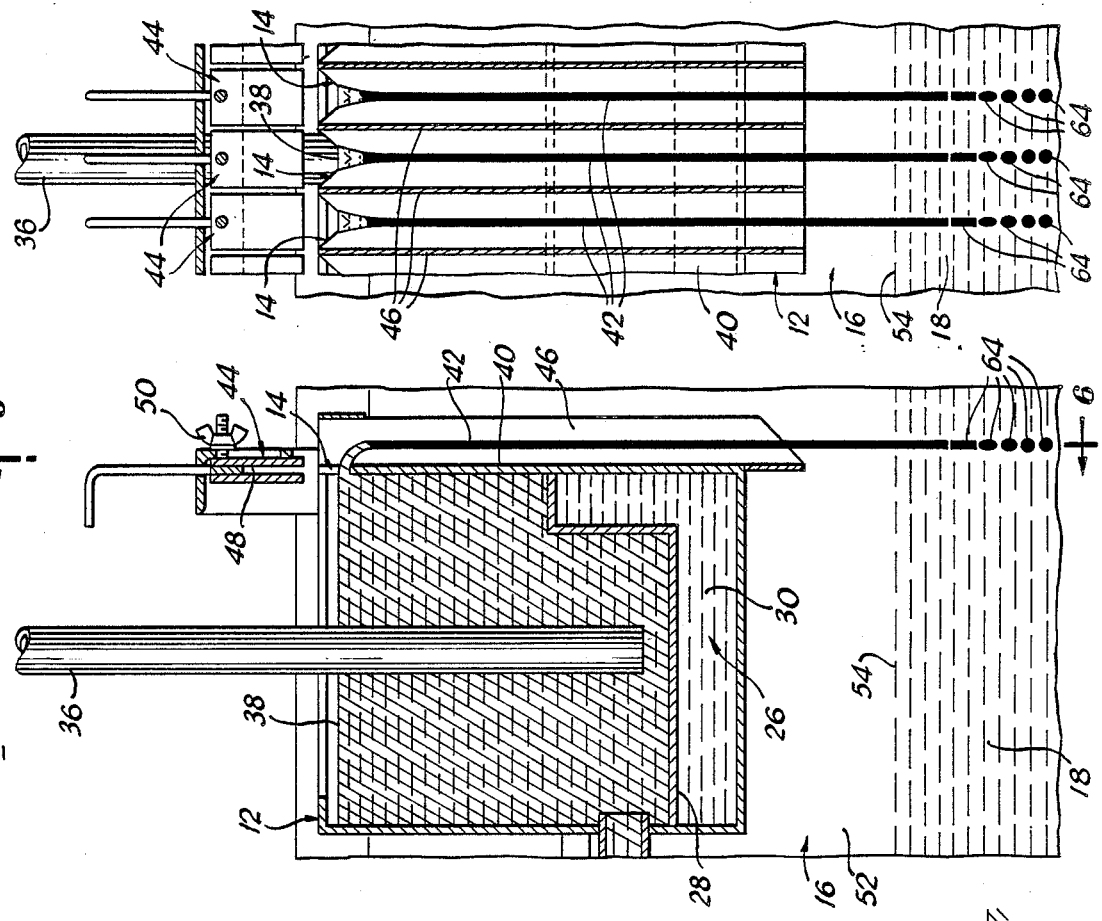

METHOD FOR MANUFACTURING DISCRETE PELLETS OF ASPHALTIC MATERIAL

FIELD OF THE INVENTION

The present invention is directed to a method and apparatus for manufacturing discrete solid particles of hydrocarbonaceous material in relatively dustless form from a liquid hydrocarbon. More particularly, the present invention is directed to a method and apparatus for manufacturing discrete solid pellets of asphaltene material by directing liquid asphaltic material through a flow channel to permit the liquid asphaltic material to drop downwardly, in the form of an elongated annular stream, into cooling water whereupon the liquid stream will solidify and shatter into relatively dustless pellets having a relatively uniform particle size.

BACKGROUND OF THE INVENTION AND PRIOR ART

Heavy petroleum residues resulting from the crude oil refining industry have been treated to recover nondistillable oils by conventional solvent extraction and, more recently, by an energy-efficient process called the ROSE process (Residuum Oil Supercritical Extraction). The ROSE process is an energy-efficient solvent extraction process developed by Kerr-McGee Refining Corporation for upgrading heavy crudes and residuals. In accordance with the ROSE process, asphaltenes, resins and oils can be separated and the solvent recovered without using traditional vaporization and liquification steps thereby substantially reducing the energy requirements to recover the recyclable solvent. The ROSE process is described in a brochure entitled "ULTIMATE UTILIZATION OF FCC CAPACITY WITH THE ROSE ® PROCESS, by W.L. Vermilion and J.A. Gearhart presented at the Katalistiks' 4th Annual Fluid Cat Cracking Symposium May 18–19, 1983 Amsterdam, The Netherlands.

In accordance with this ROSE process, one of the separated fractions from the residuum oil is a liquid asphaltene recovered from a flash tower where solvent is flashed away from the liquid asphaltene product.

Until recently, this asphaltene product presented a serious environmental problem since it was a waste product and very costly to transport and bury in a land fill. More recently, others have taken the hot liquid asphaltenes and spread them as a film on a cooled belt to solidify the material. The solidified asphaltene, as a thin flake, then was ground to a powder for use in asphalt road paving and the like. This method of recovering the asphaltenes in the form of a flat solid flake thereafter ground to a fine powder has produced many problems, particularly the creation of large quantities of dust when the flake is broken into a grindable size and in handling problems of the fine powder after grinding.

In accordance with the present invention, the liquid asphaltene material is flowed by gravity through a flow channel downwardly in the form of an annular elongated stream into a reservoir of cooling liquid to cause solidification and shattering of the liquid stream into pellets of relatively uniform particle size. The pellets are recovered from the water in relatively dustless form and any solid fines can be recirculated to a liquid asphalt reservoir for reliquification.

SUMMARY OF THE INVENTION

In brief, the present invention is directed to a method and apparatus for manufacturing discrete solid particles of hydrocarbonaceous material, such as asphaltenes, in relatively dustless form including heating the hydrocarbonaceous material, solid at standard conditions of temperature and pressure, to maintain the hydrocarbonaceous material in liquid form, and flowing the liquid hydrocarbonaceous material by gravity as an elongated annular stream into a reservoir of cooling liquid, such as cooling water, to solidify and shatter the annular stream into discrete solid particles in relatively dustless form. The apparatus includes a hopper for collecting a mass of heated liquid hydrocarbonaceous material; a heating source for heating the hydrocarbonaceous material to maintain it in liquid form; and flow channels operatively connected to the hopper at an upper level of the liquid hydrocarbonaceous material for flowing the liquid hydrocarbonaceous material in an elongated annular stream through the flow channel and into a reservoir of cooling water to solidify and shatter the stream of hydrocarbonaceous material into discrete solid particles. The discrete solid particles are collected from the cooling water and conveyed to a drying and cooling zone and can be packaged in discrete particles of relatively uniform size in dustless form for transporting for reliquification and use on site in any industry where hydrocarbonaceous heavy materials, such as asphalt, are used.

Accordingly, an object of the present invention is to provide a new and improved method and apparatus for manufacturing discrete solid particles of hydrocarbonaceous material.

Another object of the present invention is to provide a new and improved method and apparatus for solidifying a liquid hydrocarbonaceous material into particles of relatively uniform particle size.

Still another object of the present invention is to provide a new and improved method and apparatus for solidifying a liquid hydrocarbonaceous material in the form of discrete particles without creating solid dust.

Still another object of the present invention is to provide a new and improved method and apparatus for solidifying liquid asphaltic materials into discrete particles or pellets having a relatively uniform particle size by cooling a falling stream of the liquid asphaltic material at such a rate that the stream will shatter into particles or pellets having a relatively uniform particle size.

The above and other objects and advantages of the present invention will become apparent from the following detailed description of the present invention taken in conjunction with the drawings.

BRIEF DESCRIPTION OF THE DRAWINGS

FIG. 1 is a partially elevated, partially broken-away cross-sectional view of the apparatus of the present invention;

FIG. 2 is a partially elevated top view of the apparatus of the present invention taken through the line 2—2 of FIG. 1;

FIG. 3 is a cross-sectional view of a cooling and drying zone portion of the apparatus of the present invention taken through the line 3—3 of FIG. 1;

FIG. 4 is a partially elevated cross-sectional view showing a portion of the apparatus of the present invention including liquid hydrocarbonaceous material flow channels disposed above a cooling water reservoir and an auger disposed in a lower portion of the cooling water for conveying the discrete particles to a drying and cooling zone;

FIG. 5 is a partially elevated cross-sectional view of a portion of the apparatus of the present invention taken through the line 5—5 of FIG. 4;

FIG. 6 is a partially broken-away partially elevated cross-sectional view of the apparatus of the present invention taken through the line 6—6 of FIG. 5.

DETAILED DESCRIPTION OF THE PREFERRED EMBODIMENT

Turning now to the drawings, and initially to FIGS. 1 and 2, there is illustrated apparatus for solidifying a liquid hydrocarbonaceous material, such as an asphaltic material, particularly a non-distillable heavy hydrocarbon remaining from solvent extraction of a residuum oil, generally designated by reference numeral 10. The apparatus 10 generally includes a liquid hydrocarbonaceous material hopper, generally designated by reference numeral 12; a plurality of V-shaped flow channels, generally designated 14, operatively connected to the hopper 12 at a liquid level surface within the hopper 12; a cooling liquid reservoir generally designated 16 having a level of water or other cooling liquid 18 therein disposed beneath the liquid hydrocarbonaceous material hopper 12; an auger 20 disposed within a tubular U-shaped auger housing 22 disposed in a lower portion of the cooling liquid reservoir 16 for conveying solidified hydrocarbonaceous material out of the cooling liquid reservoir 16 to a drying and cooling station generally designated 24.

As best shown in FIG. 5, the liquid hydrocarbonaceous material hopper 12 has a heating chamber generally designated 26 adjacent to an undersurface thereof at a common wall 28. A heated liquid, such as hot oil 30, is recirculated through inlet conduit 32 (FIG. 4), outlet conduit 34 and through a heat exchanger (not shown) to maintain the hot oil at a sufficient temperature to transfer sufficient heat to the liquid hydrocarbonaceous material to maintain that liquid hydrocarbonaceous material within the liquid hydrocarbonaceous material hopper 12 at a temperature of at least 450° F. and below a maximum of its combustion temperature, generally for asphaltic material at about 650° F. The liquid hydrocarbonaceous material hopper 12 further includes a liquid hydrocarbonaceous material inlet conduit 36 for directing liquid hydrocarbonaceous material into the hopper 12 to maintain a substantially constant hydrocarbonaceous material liquid level 38. The inlet conduit 36 can include a control valve operatively connected to a liquid level float switch (not shown) within the hopper 12 to maintain a very precise liquid level 38 within the hopper 12.

As best shown in FIGS. 4–6, a plurality of V-shaped spaced, horizontal flow channels 14 are provided at a sidewall 40 of the liquid hydrocarbonaceous material hopper 12 for flow of hydrocarbonaceous material downwardly through the flow channels 14 by gravity as elongated annular streams 42 to be received by the cooling water 18 disposed therebelow. The flow channels 14 are formed by V-shaped notches in the hopper sidewall 40 and each V-shaped notch includes a slideable gate valve generally designated 44 for opening or closing each individual flow channel 14 so that any desired number of the flow channels 14 can be opened for flow of the material downwardly toward the cooling water 18.

To achieve the full advantage of the present invention, the flow channels 14 are disposed at the liquid level surface within the hopper 12 so that the annular streams flow by gravity through the flow channels 14 without entraining air in the annular stream. It has been found that if liquid asphaltic material reaches a level above the gate valves 44, thereby forming a liquid seal behind the gate valves 44 to form an orifice through which the liquid asphaltic material flows under a head of liquid pressure, the increased pressure causes the liquid asphalt to entrain air thereby causing a substantial percentage of asphaltic pellets to float when formed in the cooling water 18. Floating pellets do not cool quickly enough for process efficiency. Further, above atmospheric pressure feeding below a head of liquid asphaltic material through orifices causes the material to spray out of the orifice thereby forming a substantial quantity of small particles and fines when the sprayed portion of the liquid asphalt cools in the cooling water 18. Accordingly, to achieve the full advantage of the present invention the gate valves 44 should be raised and maintained at least slightly above the upper level of the liquid asphaltic material in hopper 12. The stream 42 have a diameter of ¼ inch to ¾ inch, generally 178 inch to ⅜ inch.

Spacing walls 46 extend generally perpendicular to the sidewall 40 of the hopper 12 between each of the annular streams 42 to reduce air turbulence around the annular streams 42 to make sure that the annular streams 42 drop vertically as annular streams to provide very uniformly sized solid particles collected from the cooling water 18, as will be described in more detail hereinafter. The gates 44 are opened and closed through gate slide channels 48 secured in the open or closed position by a wing nut mechanism 50.

The cooling water reservoir 16 is disposed directly beneath the liquid hydrocarbonaceous material hopper 12 and includes generally V-shaped walls 52 converging toward the tubular auger housing 22 and auger 20. The cooling water 18 fills the reservoir 16 to a level 54 disposed below the material hopper 12 and heating chamber 26. The cooling water 18 constantly is circulated within the cooling water reservoir 16 through inlet and outlet conduits 56 and 58 or 60 and 62 for cooling through a heat exchanger (not shown) to maintain the cooling water 18 at a sufficiently low temperature to solidify and shatter the downwardly flowing annular streams of hydrocarbonaceous material 42 into relatively uniformly sized particles or pellets 64.

In accordance with an important feature of the present invention, when the apparatus is used for manufacturing discrete pellets of asphaltic material, the cooling water 18 should be maintained at a temperature of 135° F. or below. To achieve the full advantage of the present invention, the cooling water 18 should be maintained at 130° F. or below and preferably 120° F. or below. It has been found that a cooling water temperature above about 135° F., while permitting solidification of the falling stream 42 of hydrocarbonaceous asphaltic material, will result in pellets 64 which, when removed from the cooling water 18 remain soft and sticky so that a plurality of the pellets 64 will adhere together making it more difficult to package and handle the materials as discrete pellets.

Because of the converging nature of hopper walls 52 toward the U-shaped tubular auger housing 22, the pellets 64 are directed toward the auger 20 and conveyed by the auger 20 upwardly through the auger housing 22 to the drying and cooling station 24 (FIGS. 1–3). The drying and cooling station 24 includes a continuous, liquid-porous conveyor belt 66 for receiving the pellets 64 dropping by gravity through an auger housing exit opening 68. A trough or hopper 70 is disposed between the auger housing exit opening 68 and an upper surface of the continuous liquid-porous conveyor belt 66 to maintain the pellets 64 on the conveyor belt 66. The continuous conveyor belt 66 rotates over spaced rollers 72 and 74 at least one of which is motorized for constant rotation of the conveyor belt 66. A suction fan 76, rotated by motor 77, is connected in fluid communication to an undersurface of the conveyor belt 66 through duct 78, water and fines dropout box 80 and ducts 82 and 84 to suck water and fines through the conveyor belt 66 for collection in the dropout box 80 and to cool the pellets 64 on the conveyor belt 66. Duct 84, disposed under the upper portion of the conveyor belt 66, is closed on all sides except for an upper opening 86 directly under the conveyor belt 66 to provide a suction opening to draw water and fines through the belt 66 and into the water and fines dropout box 80.

I claim:

1. A method of manufacturing discrete solid particles of asphaltic material in relatively dustless form having a substantially uniform particle size from a liquid asphaltic material comprising heating the asphaltic material to a temperature of at least 450° F. to maintain the asphaltic material in liquid form, and flowing the liquid asphaltic material by gravity as an elongated continuous stream into a cooling liquid having a temperature of 130° F. or below to solidify and shatter the stream into discrete solid particles in substantially dustless form.

2. The method of claim 1 wherein the asphaltic material comprises a heavy fraction of crude oil remaining as bottoms material after distillation of said crude oil.

3. The method of claim 2 wherein the asphaltic material comprises asphaltenes.

4. The method of claim 3 wherein the asphaltenes have a softening point, at one atmosphere pressure, within the range of 220° F. to 280° F.

5. The method of claim 4 wherein the asphaltenes have a softening point, at one atmosphere pressure, within the range of 240° F. to 260° F.

6. The method of claim 1 including maintaining the cooling liquid at a temperature of 130° F. or below.

7. The method of claim 1 including maintaining the cooling liquid at a temperature of 120° F. or below.

8. The method of claim 1 including flowing the liquid asphaltenes through a flow channel to provide an liquid asphaltic stream, flowing downwardly toward the cooling liquid by gravity, having a diameter of ¼ inch to ¾ inch.

9. The method of claim 9 wherein the downwardly flowing stream has a diameter of ½ inch to ⅝ inch.

10. The method of claim 1 including maintaining the liquid asphaltic material at a temperature of 500° F. to 550° F. prior to flowing said asphaltic material through the flow channel.

11. The method of claim 1 including collecting and removing said solid particles from said cooling liquid.

12. The method of claim 11 including the steps of dewatering and cooling said collected solid particles.

13. The method of claim 12 including the step of separating finer solid particles having a predetermined maximum particle size from the larger collected solid particles and recycling said finer solid particles to said liquid asphaltic material to re-liquify said finer solid particles.

14. The method of claim 13 wherein said separation is carried out by screening on a drying belt.

15. A method of manufacturing discrete solid particles of hydrocarbonaceous material in relatively dustless form having a substantially uniform particle size from a liquid hydrocarbon comprising heating a hydrocarbonaceous material, solid at standard conditions of temperature and pressure, to maintain the hydrocarbonaceous material in liquid form having a liquid level surface, and flowing the liquid hydrocarbonaceous material by gravity from the said liquid level surface as an elongated stream into a cooling liquid to solidify and shatter the stream into discrete solid particles of uniform particle size in substantially dustless form.

16. The method of claim 15 wherein the hydrocarbonaceous material comprises a heavy fraction of crude oil remaining as bottoms material after distillation of said crude oil.

17. The method of claim 16 wherein the hydrocarbonaceous material comprises asphaltenes.

18. The method of claim 17 wherein the asphaltenes have a softening point, at one atmosphere pressure, within the range of 220° F. to 280° F.

19. The method of claim 18 wherein the asphaltenes have a softening point, at one atmosphere pressure, within the range of 240° F. to 260° F.

20. The method of claim 15 including maintaining the cooling liquid at a temperature of 135° F. or below.

21. The method of claim 15 including maintaining the cooling liquid at a temperature of 130° F. or below.

22. The method of claim 15 including maintaining the cooling liquid at a temperature of 120° F. or below.

23. The method of claim 15 including flowing the liquid asphaltenes through a flow channel to provide an annular liquid hydrocarbonaceous stream, flowing downwardly toward the cooling liquid by gravity, having a diameter of ¼ inch to ¾ inch.

24. The method of claim 23 wherein the downwardly flowing annular stream has a diameter of 178 inch to ⅝ inch.

25. The method of claim 15 including maintaining the liquid hydrocarbonaceous material at a temperature of 450° F. to 650° F. prior to flowing said hydrocarbonaceous material through a flow channel.

26. The method of claim 25 including maintaining the liquid hydrocarbonaceous material at a temperature of 500° F. to 550° F. prior to flowing said hydrocarbonaceous material through the flow channel.

27. The method of claim 15 including collecting and removing said solid particles from said cooling liquid.

28. The method of claim 27 including the steps of dewatering and cooling said collected solid particles.

29. The method of claim 28 including the step of separating finer solid particles having a predetermined maximum particle size from the larger collected solid particles and recycling said finer solid particles to said liquid hydrocarbonaceous material to re-liquify said finer solid particles.

30. The method of claim 29 wherein said separation is carried out by screening on a drying belt.

* * * * *